(12) United States Patent  
Chudzinski et al.

(10) Patent No.: US 9,069,650 B2  
(45) Date of Patent: Jun. 30, 2015

(54) METHOD FOR AN ENTERTAINMENT SYSTEM OF A VEHICLE

(71) Applicant: VOLKSWAGEN AG, Wolfsburg (DE)

(72) Inventors: Filip Piotr Chudzinski, Berlin (DE); Mathias Kuhn, Berlin (DE)

(73) Assignee: VOLKSWAGEN AG, Wolfsburg (DE)

( * ) Notice: Subject to any disclaimer, the term of this patent is extended or adjusted under 35 U.S.C. 154(b) by 98 days.

(21) Appl. No.: 13/723,232

(22) Filed: Dec. 21, 2012

(65) Prior Publication Data

US 2013/0166147 A1     Jun. 27, 2013

(30) Foreign Application Priority Data

Dec. 23, 2011 (DE) .......................... 10 2011 122 614  
May 5, 2012 (DE) .......................... 10 2012 009 131

(51) Int. Cl.

| | |
|---|---|
| *G06F 17/00* | (2006.01) |
| *A63F 13/216* | (2014.01) |
| *A63F 13/34* | (2014.01) |
| *A63F 13/80* | (2014.01) |
| *A63F 13/2145* | (2014.01) |

(52) U.S. Cl.  
CPC .............. *G06F 17/00* (2013.01); *A63F 13/216* (2014.09); *A63F 13/2145* (2014.09); *A63F 13/34* (2014.09); *A63F 13/80* (2014.09)

(58) Field of Classification Search  
CPC ................. H04N 19/00884; H04N 19/00545; H04N 19/00424; H04N 19/00551; G08G 1/163; H04W 4/04; G06F 17/00; A63F 13/216; A63F 13/2145; A63F 13/34; A63F 13/80  
USPC .......... 701/36; 463/40; 434/68, 128, 341, 347  
See application file for complete search history.

(56) References Cited

U.S. PATENT DOCUMENTS

| | | | |
|---|---|---|---|
| 2007/0201681 | A1* | 8/2007 | Chen et al. ................ 379/355.02 |
| 2011/0102459 | A1* | 5/2011 | Hall .............................. 345/633 |
| 2012/0038489 | A1* | 2/2012 | Goldshmidt .................. 340/903 |

OTHER PUBLICATIONS

Kunii, JP2007-015460, Jan. 25, 2007 (machine translation).*

* cited by examiner

*Primary Examiner* — Fadey Jabr  
*Assistant Examiner* — Courtney Heinle  
(74) *Attorney, Agent, or Firm* — Barnes & Thornburg LLP

(57) ABSTRACT

A method for an entertainment system of a vehicle wherein a distance between the vehicle and a further vehicle is determined, and a symbol for the vehicle and a symbol for the further vehicle are displayed on a display device of the vehicle on the basis of the distance between the vehicle and the further vehicle. Actuation of a user control element is detected after the symbol for the further vehicle has been displayed. An actuation signal is received from the further vehicle indicating that a user of the further vehicle has actuated a corresponding control element of the further vehicle on account of a symbol for the further vehicle and a symbol for the vehicle being displayed on a display device of the further vehicle.

21 Claims, 2 Drawing Sheets

METHOD FOR AN ENTERTAINMENT SYSTEM OF A VEHICLE

PRIORITY CLAIM

This patent application claims priority to German Patent Application No. 10 2011 122 614.5, filed 23 Dec. 2011, and German Patent Application No. 10 2012 009 131.1, filed 5 May 2012, the disclosures of which are incorporated herein by reference in their entirety.

FIELD

Disclosed embodiments relate to a method for an entertainment system of a vehicle and to a corresponding entertainment system.

BACKGROUND

Relatively long journeys in a vehicle, for example an automobile or a truck, may not be very interesting, in particular for a passenger in the vehicle, since the passenger generally does not have to perform any tasks and is therefore inactive. Entertainment games which can be carried out in the vehicle were therefore invented as early as at the beginning of the spread of vehicles. In this context, a game in which a place or district of registration is guessed or looked up using the license plate is known, for example. A game which is popular in the United States of America is the so-called "punch buggy" game. The participants look out for a Volkswagen "Beetle" and whoever first spots such a vehicle punches or pinches the arm of another participant and shouts "punch buggy!" with reference to the nickname of the Volkswagen Beetle. In addition, entertainment systems which play music or videos, for example, are used to entertain the occupants in vehicles.

SUMMARY

Disclosed embodiments provide further entertainment possibilities for occupants of a vehicle.

Disclosed embodiments provide a method for an entertainment system of a vehicle, an entertainment system for a vehicle and a vehicle.

BRIEF DESCRIPTION OF THE DRAWINGS

Disclosed embodiments are explained in detail below with reference to the accompanying drawings.

DETAILED DESCRIPTION OF THE DISCLOSED EMBODIMENTS

Figure 1:
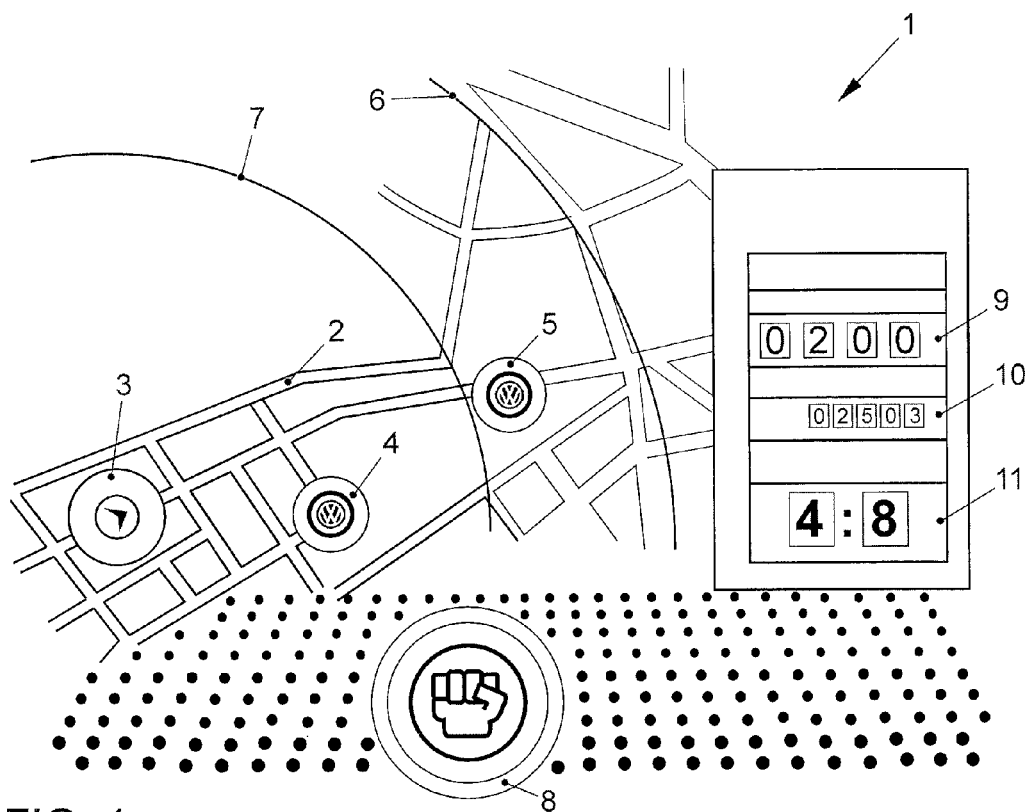
FIG. 1 shows an illustration of symbols for vehicles on a display device of a vehicle according to at least one disclosed embodiment.

Disclosed embodiments provide a method for an entertainment system of a vehicle. In the method, a distance between the vehicle and a further vehicle is determined, and a symbol for the vehicle and a symbol for the further vehicle are displayed on a display device of the vehicle on the basis of the distance between the vehicle and the further vehicle. In order to linguistically distinguish between the "vehicle" and the "further vehicle", the "vehicle" is also referred to below as the "user's vehicle". Actuation of a user control element is detected after the symbol for the vehicle and the symbol for the further vehicle have been displayed on the display device. Furthermore, an actuation signal is received from the further vehicle. In the further vehicle, a symbol for the further vehicle and a symbol for the vehicle are likewise displayed for the user of the further vehicle on a display device of the further vehicle. The actuation signal from the further vehicle indicates that the user of the further vehicle has actuated a user control element of the further vehicle on account of the symbol for the further vehicle and the symbol for the vehicle being displayed. A predetermined process is carried out in the entertainment system if the actuation of the control element has been detected before the actuation signal has been received from the further vehicle. In other words, the users of two vehicles are each provided with a display of the user's vehicle and at least one further vehicle on corresponding display devices of the vehicles if the further vehicle is within a predetermined distance from the user's vehicle. The users of the vehicles must then actuate a user control element as quickly as possible. The actuation of the user control element is transmitted to the respective other vehicle and a process is carried out in the entertainment system of the vehicle in which the user control element was actuated first. The practice of carrying out the process may comprise, for example, incrementing a counter or may comprise an optical or acoustic output. An electronic form of the "punch buggy" game is therefore carried out between occupants of different vehicles. As a result, occupants of the vehicles may be entertained and occupied.

According to at least one disclosed embodiment, in the method, an item of position information relating to the vehicle is also determined, and the position information is transmitted to the further vehicle. An actuation signal is transmitted from the vehicle to the further vehicle if the actuation of the user control element in the vehicle has been detected. The actuation signal indicates that the user has actuated the user control element on account of the symbol for the user's vehicle and the symbol for the further vehicle being displayed on the display device. The position information and the actuation signal can be transmitted from the vehicle to the further vehicle using so-called car-to-car communication, for example. This makes it possible to ensure fast communication between the vehicles.

According to another disclosed embodiment, in the method, an item of type information is also received from the further vehicle. The type information comprises a manufacturer name and a model name for the further vehicle. The symbol for the further vehicle is displayed on the display device of the vehicle on the basis of the distance and the type information. Only particular vehicle types which can participate in the entertainment game can therefore be displayed on the display device, for example. In addition, the manufacturer name and model name for the further vehicle can be additionally displayed on the display device in conjunction with the symbol for the further vehicle.

According to another disclosed embodiment, an acoustic or optical signal is output in the vehicle if the actuation signal has been received from the further vehicle before the actuation of the user control element has been detected. In this case, the driver of the further vehicle was quicker and a corresponding indication in the form of an acoustic or optical signal can be output in the user's vehicle. In addition, a further counter can be incremented, for example, if the actuation signal has been received from the further vehicle before the actuation of the user control element in the user's vehicle has been detected. A user of the vehicle can therefore determine, using the counter and the further counter, how often he himself was first to detect a further vehicle and to virtually push it via the user control element and how often he was slower than a user of a further vehicle and was thus virtually pushed by a user of a further vehicle.

In another disclosed embodiment of the method, an item of position information is received from the further vehicle, and the distance between the vehicle and the further vehicle is determined on the basis of the position information relating to the further vehicle. As described above, communication between the vehicle and the further vehicle can be carried out using car-to-car communication, thus making it possible to ensure a fast response behavior which is required for the entertainment game. By virtue of the fact that the vehicles interchange their position information with one another, it is possible to display the vehicle's own position and the positions of the further vehicles in each vehicle in a simple manner, for example on a map.

In yet another disclosed embodiment, an item of direction information is displayed on the basis of the position information relating to the further vehicle. The direction information indicates a direction in which the further vehicle is located relative to the user's vehicle. The direction information can be indicated, for example, by driving a plurality of lighting devices arranged in the interior of the vehicle in turn on the basis of the position information relating to the further vehicle. If, for example, a plurality of horizontally arranged lighting devices are arranged in a dashboard of the vehicle, these devices can be activated in turn in such a manner that a direction to the further vehicle is indicated by the lighting course.

In another disclosed embodiment of the method, the symbol for the further vehicle is displayed in two different manners. The symbol for the further vehicle is displayed in a first manner if the distance between the vehicle and the further vehicle is between a first threshold value and a second threshold value. The symbol for the further vehicle is displayed in a second manner if the distance between the vehicle and the further vehicle is less than or equal to the second threshold value. If the distance between the vehicle and the further vehicle is greater than the first threshold value, the symbol for the further vehicle may not be displayed at all, for example. Actuation of the user control element is detected after the symbol for the further vehicle has been displayed in the second manner, that is to say if the further vehicle is at a distance of less than or equal to the second threshold value. In other words, the further vehicle is displayed only when it is within a distance from the vehicle that is less than the first threshold value. If the distance between the vehicle and the further vehicle is between the first threshold value and the second threshold value, the second threshold value being less than the first threshold value, the symbol for the further vehicle is displayed but actuation of the user control element is ineffective. Actuation of the user control element is detected only when the distance between the vehicle and the further vehicle is less than or equal to the second threshold value and the further vehicle is thus relatively close to the user's vehicle. The first threshold value may be, for example, several hundred meters, for example 500 m, whereas the second threshold value is only 50-150 m, for example. This makes it possible to take into account the fact that the virtual pushing of the further vehicle according to the rules of the "punch buggy" game is allowed only when the further vehicle is in sight.

Disclosed embodiments also relate to an entertainment system for a vehicle. The entertainment system comprises a communication device for transmitting information between the user's vehicle and a further vehicle. The entertainment system also comprises a display device for outputting information to a user of the vehicle. The display device may be arranged, for example, in a dashboard of the vehicle, with the result that it can be seen both by a driver of the vehicle and, in particular, by a passenger in the vehicle. The entertainment system also comprises a user control element which can be actuated by the user, in particular a passenger, of the vehicle, and a processing unit which is coupled to the communication device, the display device and the user control element. The user control element may comprise, for example, a separate pushbutton or may be implemented, for example, by means of a touch-sensitive surface on the display device by virtue of a corresponding user control element being displayed on the display device. The processing unit is able to determine a distance between the vehicle and the further vehicle and to display a symbol for the vehicle and a symbol for the further vehicle on the display device on the basis of the distance between the vehicle and the further vehicle. Actuation of the user control element is detected by the processing unit after the symbol for the vehicle and the symbol for the further vehicle have been displayed on the display device. An actuation signal is received from the further vehicle via the communication device. The actuation signal indicates that a user of the further vehicle has actuated a corresponding user control element of the further vehicle on account of a symbol for the further vehicle and a symbol for the vehicle being displayed on a display device of the further vehicle. A process is carried out in the entertainment system, for example incrementing a counter or outputting an optical or acoustic signal, if the actuation of the user control element of the user's vehicle has been detected before the actuation signal has been received from the further vehicle. The entertainment system may be designed to carry out the method described above or one of its disclosed embodiments and, therefore, also comprises the advantages described in connection with the method.

Disclosed embodiments finally provide a vehicle which comprises the entertainment system described above.

Disclosed embodiments relate to a method for an entertainment system of a vehicle. In the method, an American children's game which has been known since the 60s and is called "punch buggy", "punch bug", "slug bug" or "Beetle bug" is converted into an electronically assisted game between vehicles in order to entertain vehicle occupants. In the original children's game, a participant in the game pinched or prodded the arm of another participant as soon as he spotted a particular vehicle type, in particular a so-called Volkswagen Beetle, and this participant simultaneously shouted "slug bug!" or "punch buggy!" with reference to the nickname of the Volkswagen Beetle "bug".

When converting this game into an electronic variant, vehicles which allow prodding or pinching according to the children's game, so-called "punching", are displayed on a display device of the vehicle if they are within a predetermined distance from the user's vehicle. The vehicle which is identified in this manner and can be punched can be virtually pushed via a control element of the vehicle. If there are a plurality of vehicles which can be punched, one of the vehicles can be selected using a touchscreen on the display device, for example, and can be punched. The control element for punching may be, for example, a so-called soft key, that is to say a virtual control element displayed on the touchscreen of the display device, or a separate control element, for example a pushbutton. A corresponding counter can be incremented for each vehicle punched. Conversely, the user's vehicle can be punched by other vehicles, as a result of which a further counter, for example, is incremented in the user's vehicle.

Within the scope of the disclosed embodiments, the term "punch" is used synonymously for virtual pushing or poking of a vehicle or more precisely an occupant of a vehicle in the sense of the children's game described above. In the electronic implementation of the children's game, the occupants of different vehicles compete against one another as participants in the game. Punching a vehicle therefore corresponds to virtual punching of an occupant of another vehicle. Each time a vehicle is punched, a fellow player receives positive points and each time a vehicle is punched by another vehicle, the occupant of the punched vehicle receives negative points. The aim is to increase the number of positive points and keep the number of negative points as low as possible.

FIG. 1 shows an output of an entertainment system on a display device 1. The display device 1 may be designed, for example, to output graphical information in a color representation. The position of the user's vehicle is displayed on the display device 1 as a symbol 3, for example on a map representation 2. Further vehicles which can be punched according to the rules of the game are displayed as symbols 4, 5 on the map representation 2. In the children's game, the participants punched each other as soon as corresponding vehicles were spotted. In order to simulate this, only vehicles within a predetermined distance can be punched, for example. For this purpose, a first distance ring 6 and a second distance ring 7 can be displayed concentrically with respect to the symbol 3 for the user's vehicle on the display device 1, for example. If a vehicle of a particular type, for example the vehicle denoted with the symbol 5, is located between the first distance ring 6 and the second distance ring 7, the vehicle can already be displayed but cannot yet be punched by the occupant of the user's vehicle. Vehicles outside the first distance ring 6 are not displayed. If the vehicle is located within the second distance ring 7, for example the vehicle represented by the symbol 4, the vehicle can be punched and, for example, can be highlighted, for example in a flashing manner or with a particular color. In order to punch a vehicle, an occupant of the vehicle actuates a user control element 8 which is displayed, for example, as a so-called soft key on the display device 1. Actuation of this user control element 8 can be detected, for example, using a touch-sensitive surface of the display device 1, a so-called touchscreen.

Corresponding outputs, as were previously described in connection with FIG. 1, are also displayed on corresponding display devices of the vehicles represented by the symbols 4 and 5. The vehicles represented by the symbols 3, 4 are located at a distance from one another in which the vehicles can be mutually punched. The vehicle represented by the symbol 5 is currently still outside the punching range of the vehicle 3 but is inside the punching range of the vehicle 4. Points are now allocated depending on which vehicle punches which other vehicle first. If the user control element 8 in the vehicle 3 is actuated first, a daily scoreboard 9, for example, is incremented. A total counter 10 may be additionally incremented. A further counter 11 can indicate how often the user's vehicle was punched within a predetermined period of time and how often an occupant of the user's vehicle punched another vehicle within the predetermined period of time. If a plurality of vehicles which can be punched are within the punchable distance 7, as could be the case for the vehicle 4 for example, the vehicle to be punched, for example, can be selected via the touch-sensitive surface of the display device 1 and can then be punched by actuating the user control element 8.

Figure 2:
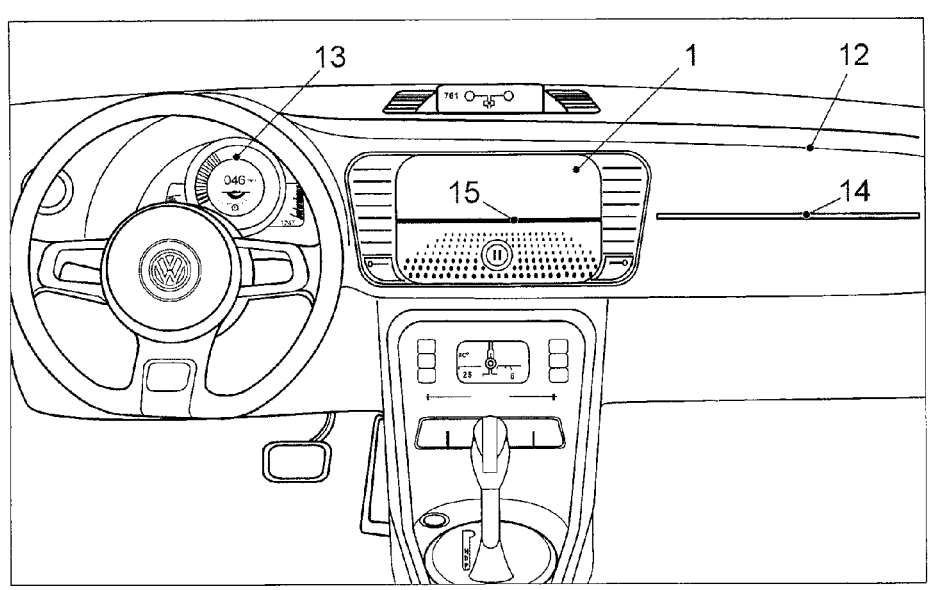
FIG. 2 shows a dashboard having a display apparatus of a vehicle according to at least one disclosed embodiment.

FIG. 2 shows an interior of a vehicle having the display device 1. The display device 1 is arranged in a dashboard 12 of the vehicle. Alternatively, the display device 1 may also be part of a combination instrument 13. A linear lighting device 14 is provided in the dashboard 12 in the region of the passenger. The lighting device 14 is also referred to as ambient lighting. The lighting device 14 may consist, for example, of a plurality of successive linear sections which can be switched either on or off or whose luminous color can be set. In addition to the display on the display device 1, which has already been described in connection with FIG. 1, the display device 1 and/or the lighting device 14 may also be used to output an indication of the direction to a vehicle which is or can be punched. For this purpose, a line 15 which is substantially an extension of the linear form of the lighting device 14 may be displayed on the display device 1, for example. If, for example, a vehicle which is or can be punched is located to the left or right of the user's vehicle, a running light which indicates the direction to the vehicle can be produced by suitably activating the line 15 and the lighting device 14.

Figure 3:
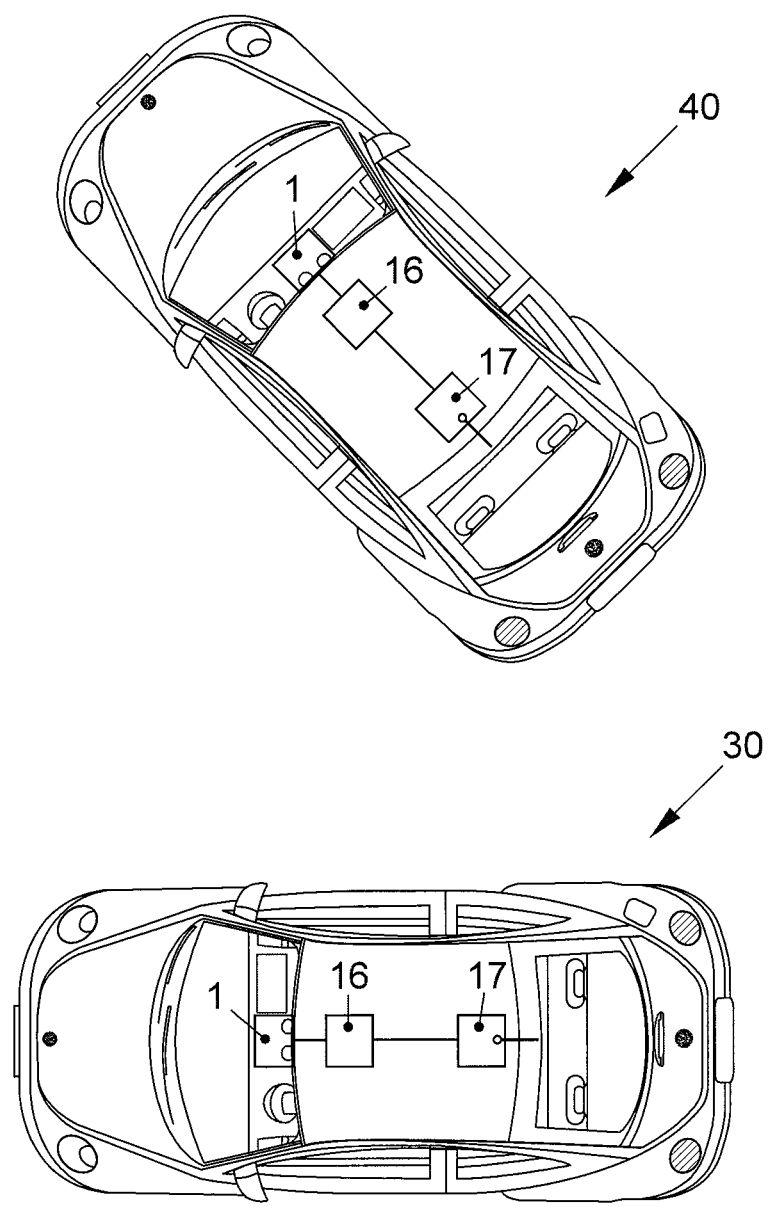
FIG. 3 shows a vehicle and a further vehicle according to at least one disclosed embodiment.

FIG. 3 shows two vehicles 30, 40. Each of the vehicles 30, 40 comprises the display device 1 described above, a processing unit 16 and a communication device 17. The communication device 17 is used to transmit information between the vehicles 30, 40. The information can be transmitted, for example, using so-called car-to-car communication. In addition, communication can also be carried out via infrastructure components connected in between, for example a mobile radio communication network. Each of the vehicles is also able to determine its own position, for example using a global positioning system (GPS). The vehicle 40 transmits its own position and its own vehicle type to the vehicle 30, for example via its communication device 17. The vehicle 30 receives this information via the communication device 17. The processing unit 16 processes the received information and displays the vehicle 40 as a symbol 4 on the display device 1, as previously described in connection with FIG. 1. The type information relating to the vehicle can be used, for example, to ensure that only particular vehicle types can participate in the game and therefore only vehicles of particular types can also be displayed on the display device 1. If, as illustrated in FIG. 1, the vehicle 40 is within the distance 7 from the vehicle 30, this vehicle can be punched by actuating the user control element 8. A corresponding indication of the vehicle 30 in relation to the vehicle 40 can be displayed in the vehicle 40 on the display device 1 of the vehicle 40 and corresponding actuation of a user control element 8 in the vehicle 40 can be detected. As soon as user actuation in one of the vehicles 30, 40 is detected, this user actuation is transmitted, as an actuation signal, to the respective other vehicle via the communication device 17. The processing unit 16 now checks whether the user's user control element 8 has been actuated before an actuation signal has been received from another vehicle. If this is the case, an occupant in the user's vehicle was faster than an occupant in another vehicle and the scoreboards 9-11 can be accordingly adapted. In addition, further processes can be carried out in the entertainment system, for example the driving of the lighting device 14, as was described in connection with FIG. 2, or optical or acoustic signals, which indicate to the occupant that he reacted faster than an occupant in another vehicle, can also be output. Conversely, if the actuation signal from another vehicle was received before the user's user control element 8 has been actuated, the scoreboards 9-11 can be accordingly adapted and corresponding optical or acoustic outputs, which indicate to the occupant that he reacted more slowly than an occupant in another vehicle, can also be output.

The invention claimed is:

1. A method for operation of an entertainment system of a vehicle, the method comprising:
   determining, by a processor, a distance between the vehicle and a further vehicle;
   the processor displaying a symbol for the vehicle and a symbol for the further vehicle on a display device of the vehicle based on the determined distance between the vehicle and the further vehicle;
   receiving an item of type information from the further vehicle, the type information comprising a manufacturer name and a model name for the further vehicle; and
   displaying the symbol for the vehicle and the symbol for the further vehicle comprising displaying the symbol for the vehicle and the symbol for the further vehicle on the display device of the vehicle based on the distance and the type information, wherein only vehicles of a particular type are displayed;
   detecting, by a processor, actuation of a user control element after the symbol for the further vehicle has been displayed on the display device;
   receiving, at the processor, an actuation signal from the further vehicle, the actuation signal from the further vehicle indicating that a user of the further vehicle has actuated a user control element of the further vehicle based on a symbol for the further vehicle and a symbol for the vehicle being displayed on a display device of the further vehicle; and
   carrying out a predetermined process in the entertainment system in response to detection of the actuation of the user control element before receipt of the actuation signal from the further vehicle, wherein the predetermined process outputs an optical and/or acoustic output to indicate that an occupant in the vehicle was faster at actuating their user control element than an occupant in the further vehicle.

2. The method of claim 1, the operation of carrying out the process in the entertainment system further comprises incrementing a counter.

3. The method of claim 1, further comprising:
   determining an item of position information relating to the vehicle;
   transmitting the position information to the further vehicle; and
   transmitting an actuation signal from the vehicle to the further vehicle if in response to detection of the actuation of the user control element has been detected, the actuation signal indicating that the user has actuated the user control element on account of the symbol for the vehicle and the symbol for the further vehicle being displayed on the display device.

4. The method of claim 1, further comprising outputting an acoustic or optical signal in the vehicle if the actuation signal has been received from the further vehicle before the actuation of the user control element has been detected.

5. The method of claim 4, further comprising incrementing a further counter if the actuation signal has been received from the further vehicle before the actuation of the user control element has been detected.

6. The method of claim 1, further comprising:
   receiving an item of position information from the further vehicle,
   the operation of determining the distance between the vehicle and the further vehicle comprising determining the distance between the vehicle and the further vehicle based on the position information relating to the further vehicle.

7. The method of claim 6, further comprising:
   displaying an item of direction information based on the position information relating to the further vehicle, the direction information indicating a direction in which the further vehicle is located relative to the vehicle.

8. The method of claim 7, the direction information being indicated by driving a plurality of lighting devices arranged in the interior of the vehicle in turn on the basis of the position information relating to the further vehicle.

9. The method of claim 1, wherein the operation of displaying the symbol for the vehicle and the symbol for the further vehicle further comprise:
   displaying the symbol for the further vehicle in a first manner if the distance between the vehicle and the further vehicle is between a first threshold value and a second threshold value; and
   displaying the symbol for the further vehicle in a second manner if the distance between the vehicle and the further vehicle is less than or equal to the second threshold value,
   wherein the actuation of a user control element is detected after the symbol for the further vehicle has been displayed in the second manner.

10. An entertainment system for a vehicle, the system comprising:
    a communication device for transmitting information between the vehicle and a further vehicle;
    a display device for outputting information to a user of the vehicle;
    a user control element which can be actuated by the user of the vehicle, and
    a processor which is coupled to the communication device, the display device and the user control element and is configured:
       to determine a distance between the vehicle and the further vehicle,
       to display a symbol for the vehicle and a symbol for the further vehicle on the display device based on the distance between the vehicle and the further vehicle,
       to detect actuation of the user control element after the symbol for the further vehicle has been displayed on the display device, to receive an actuation signal from the further vehicle, the actuation signal from the further vehicle indicating that a user of the further vehicle has actuated a user control element of the further vehicle based on display of a symbol for the further vehicle and a symbol for the vehicle on a display device of the further vehicle, and
    to carry out a predetermined process in the entertainment system in response to detection—of the actuation of the user control element before receipt of the actuation signal from the further vehicle, wherein the predetermined process outputs an optical and/or acoustic output to indicate that an occupant in the vehicle was faster at actuating their user control element than an occupant in the further vehicle;
    wherein actuation of the user control element when the second vehicle is displayed at a distance between a first threshold value and a second threshold value is ineffective.

11. The entertainment system of claim 10, wherein the processor is further configured:
    to carry out a different predetermined process in the entertainment system in response to detection of the actuation of the user control element after receipt of the actuation signal from the further vehicle, wherein the predetermined process outputs an optical and/or acoustic output to indicate that an occupant in the further vehicle was faster at actuating their user control element than an occupant in the vehicle.

12. The entertainment system of claim 10, wherein the operation of carrying out the process in the entertainment system further comprising incrementing a counter.

13. The entertainment system of claim 10, wherein the system is further configured to:
   determine an item of position information relating to the vehicle;
   transmit the position information to the further vehicle; and
   transmit an actuation signal from the vehicle to the further vehicle if the actuation of the user control element has been detected, the actuation signal indicating that the user has actuated the user control element on account of the symbol for the vehicle and the symbol for the further vehicle being displayed on the display device.

14. The entertainment system of claim 10, wherein the system is further configured to:
   receive an item of type information from the further vehicle, the type information comprising a manufacturer name and a model name for the further vehicle, and
   display the symbol for the vehicle and the symbol for the further vehicle comprising displaying the symbol for the vehicle and the symbol for the further vehicle on the display device of the vehicle based on the distance and the type information.

15. The entertainment system of claim 10, wherein the system is further configured to output an acoustic or optical signal in the vehicle if the actuation signal has been received from the further vehicle before the actuation of the user control element has been detected.

16. The entertainment system of claim 10, wherein the system is further configured to increment a further counter if the actuation signal has been received from the further vehicle before the actuation of the user control element has been detected.

17. The entertainment system of claim 10, wherein the system is further configured to receive an item of position information from the further vehicle, and wherein the determination of the distance between the vehicle and the further vehicle comprises determining the distance between the vehicle and the further vehicle based on the position information relating to the further vehicle.

18. The entertainment system of claim 10, wherein the system is further configured to:
   display an item of direction information based on the position information relating to the further vehicle, the direction information indicating a direction in which the further vehicle is located relative to the vehicle.

19. The entertainment system of claim 18, wherein the direction information is indicated by driving a plurality of lighting devices arranged in the interior of the vehicle in turn on the basis of the position information relating to the further vehicle.

20. The entertainment system of claim 10, wherein the operation of displaying the symbol for the vehicle and the symbol for the further vehicle further comprise:
   display of the symbol for the further vehicle in a first manner if the distance between the vehicle and the further vehicle is between the first threshold value and the second threshold value; and
   display of the symbol for the further vehicle in a second manner if the distance between the vehicle and the further vehicle is less than or equal to the second threshold value,
   wherein the actuation of a user control element is detected after the symbol for the further vehicle has been displayed in the second manner.

21. A vehicle, comprising:
   a communication device for transmitting information between the vehicle and a further vehicle;
   a display device for outputting information to a user of the vehicle;
   a user control element which can be actuated by the user of the vehicle, and
   a processor which is coupled to the communication device, the display device and the user control element and is configured:
      to determine a distance between the vehicle and the further vehicle,
      to display a symbol for the vehicle and a symbol for the further vehicle on the display device based on the distance between the vehicle and the further vehicle,
      to detect actuation of the user control element after the symbol for the further vehicle has been displayed on the display device, to receive an actuation signal from the further vehicle, the actuation signal from the further vehicle indicating that a user of the further vehicle has actuated a user control element of the further vehicle based on display of a symbol for the further vehicle and a symbol for the vehicle on a display device of the further vehicle, and
      to carry out a predetermined process in response to detection of the actuation of the user control element before receipt of the actuation signal from the further vehicle, wherein the predetermined process outputs an optical and/or acoustic output to indicate that an occupant in the vehicle was faster at actuating their user control element than an occupant in the further vehicle,
   wherein actuation of the user control element when the second vehicle is displayed at a distance between a first threshold value and a second threshold value is ineffective.

* * * * *